United States Patent
Yamada et al.

(10) Patent No.: US 11,289,291 B2
(45) Date of Patent: Mar. 29, 2022

(54) GAS CIRCUIT BREAKER

(71) Applicant: Mitsubishi Electric Corporation, Tokyo (JP)

(72) Inventors: Daisaku Yamada, Tokyo (JP); Koma Sato, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/055,327

(22) PCT Filed: Jun. 25, 2018

(86) PCT No.: PCT/JP2018/023992
§ 371 (c)(1),
(2) Date: Nov. 13, 2020

(87) PCT Pub. No.: WO2020/003347
PCT Pub. Date: Jan. 2, 2020

(65) Prior Publication Data
US 2021/0183600 A1 Jun. 17, 2021

(51) Int. Cl.
*H01H 33/18* (2006.01)
*H01H 33/56* (2006.01)
*H01H 33/91* (2006.01)

(52) U.S. Cl.
CPC ............ *H01H 33/56* (2013.01); *H01H 33/18* (2013.01); *H01H 33/91* (2013.01)

(58) Field of Classification Search
CPC ...... H01H 33/182; H01H 33/56; H01H 33/64; H01H 33/78; H01H 33/88; H01H 33/91; H02B 13/035; H02B 13/02

(Continued)

(56) References Cited

U.S. PATENT DOCUMENTS 5,057,655 A * 10/1991 Kersusan ............. H01H 33/982
218/76
5,844,189 A * 12/1998 Niemeyer .......... H01H 33/7015
218/29

(Continued)

FOREIGN PATENT DOCUMENTS

GB 1540695 A 2/1979
JP S52100180 A 8/1977

(Continued)

OTHER PUBLICATIONS

International Search Report (with English Translation) and Written Opinion issued in corresponding International Patent Application No. PCT/JP2018/023992, 6 pages (dated Aug. 14, 2020).

*Primary Examiner* — William A Bolton
(74) *Attorney, Agent, or Firm* — Buchanan Ingersoll & Rooney PC

(57) ABSTRACT

A gas circuit breaker includes: a fixed arc contact disposed on an axis of motion, whose tip is directed to one side in a first direction that is parallel to the axis of motion; a movable arc contact that can reciprocate along the axis of motion between a position when in contact with the tip of the fixed arc contact and a position when separated from the tip of the fixed arc contact; and a first permanent magnet and a second permanent magnet as a permanent magnet whose magnetic poles are aligned in a second direction that is a direction perpendicular to the first direction. The fixed arc contact has a shape that is gradually widened in a direction away from the axis of motion from the tip toward another side in the first direction.

8 Claims, 5 Drawing Sheets

(58) Field of Classification Search
USPC .......................... 218/43, 23, 129, 28, 26, 68
See application file for complete search history.

(56) References Cited

U.S. PATENT DOCUMENTS

| | | | |
|---|---|---|---|
| 8,106,326 B2* | 1/2012 | Nakauchi | H01H 33/901 |
| | | | 218/55 |
| 8,274,007 B2* | 9/2012 | Blalock | H01H 33/182 |
| | | | 218/129 |
| 8,902,026 B2* | 12/2014 | Fujita | H01H 33/182 |
| | | | 335/201 |
| 2011/0042354 A1 | 2/2011 | Blalock et al. | |
| 2012/0061352 A1* | 3/2012 | Shimizu | H01H 33/182 |
| | | | 218/26 |

FOREIGN PATENT DOCUMENTS

| | | |
|---|---|---|
| JP | S52101478 A | 8/1977 |
| JP | 2002334636 A | 11/2002 |
| JP | 2009054364 A | 3/2009 |
| JP | 2012069300 A | 4/2012 |

* cited by examiner

GAS CIRCUIT BREAKER

FIELD

The present invention relates to a gas circuit breaker including a fixed arc contact and a movable arc contact that are provided in a tank filled with an insulating gas.

BACKGROUND

In interrupting an electric current flowing through a conductor provided in a tank, a gas circuit breaker separates a movable arc contact in contact with a fixed arc contact from the fixed arc contact. In order to improve a breaking performance, the gas circuit breaker takes measures for quick arc extinction to extinguish an arc produced between the movable arc contact and the fixed arc contact. In some cased, a conventional gas circuit breaker is provided with a puffer chamber in which the insulating gas in the tank is stored and a cylindrical nozzle covering the movable arc contact, and speeds up arc extinction by blowing the insulating gas. Such a gas circuit breaker performs arc extinction by blowing the insulating gas whose pressure has been increased in the puffer chamber toward the arc inside the nozzle, and cooling the space whose temperature has become high due to the production of the arc.

A disconnect switch or a grounding switch is known to improve the breaking performance by changing the direction of travel of the arc using the action of electromagnetic force and stretching the arc. Patent Literature 1 discloses a gas insulated disconnector that changes the direction of travel of the arc by the action of electromagnetic force according to the direction of a magnetic field produced by a permanent magnet and the direction of an electric current. According to the technique of Patent Literature 1, the direction of the magnetic field produced by the permanent magnet is made orthogonal to the direction of an axis of motion along which the movable arc contact is moved, and thereby the arc is stretched in the circumferential direction around the axis of motion.

CITATION LIST

Patent Literature

Patent Literature 1: Japanese Patent Application Laid-open No. 2002-334636

SUMMARY

Technical Problem

The gas circuit breaker can also improve the breaking performance further by stretching the arc using a permanent magnet in addition to blowing the insulating gas. However, when a permanent magnet similar to that of Patent Literature 1 is added to the conventional gas circuit breaker described above, the arc produced between the movable arc contact and the fixed arc contact is surrounded by the nozzle, and so the arc is stretched in the space inside the nozzle. It is difficult for the gas circuit breaker to speed up arc extinction because the space available for stretching the arc is limited to the inside of the nozzle. Therefore, it has been difficult to improve the breaking performance even when the technique of Patent Literature 1 is applied to the conventional gas circuit breaker.

The present invention has been made in view of the above circumstances, and an object thereof is to provide a gas circuit breaker capable of improving the breaking performance.

Solution to Problem

In order to solve the above-mentioned problem and achieve the object, the present invention provides a gas circuit breaker comprising: a fixed arc contact disposed on an axis of motion, whose tip is directed to one side in a first direction that is parallel to the axis of motion; a movable arc contact reciprocatable along the axis of motion between a position when in contact with the tip of the fixed arc contact and a position when separated from the tip of the fixed arc contact; and a permanent magnet whose magnetic poles are aligned in a second direction that is a direction perpendicular to the first direction, wherein the fixed arc contact has a shape that is gradually widened in a direction away from the axis of motion from the tip toward another side in the first direction.

Advantageous Effects of Invention

The present invention has an advantageous effect that the breaking performance can be improved.

DESCRIPTION OF EMBODIMENTS

A gas circuit breaker according to embodiments of the present invention will now be described in detail with reference to the drawings. Note that the present invention is not necessarily limited by these embodiments.

First Embodiment

Figure 1:
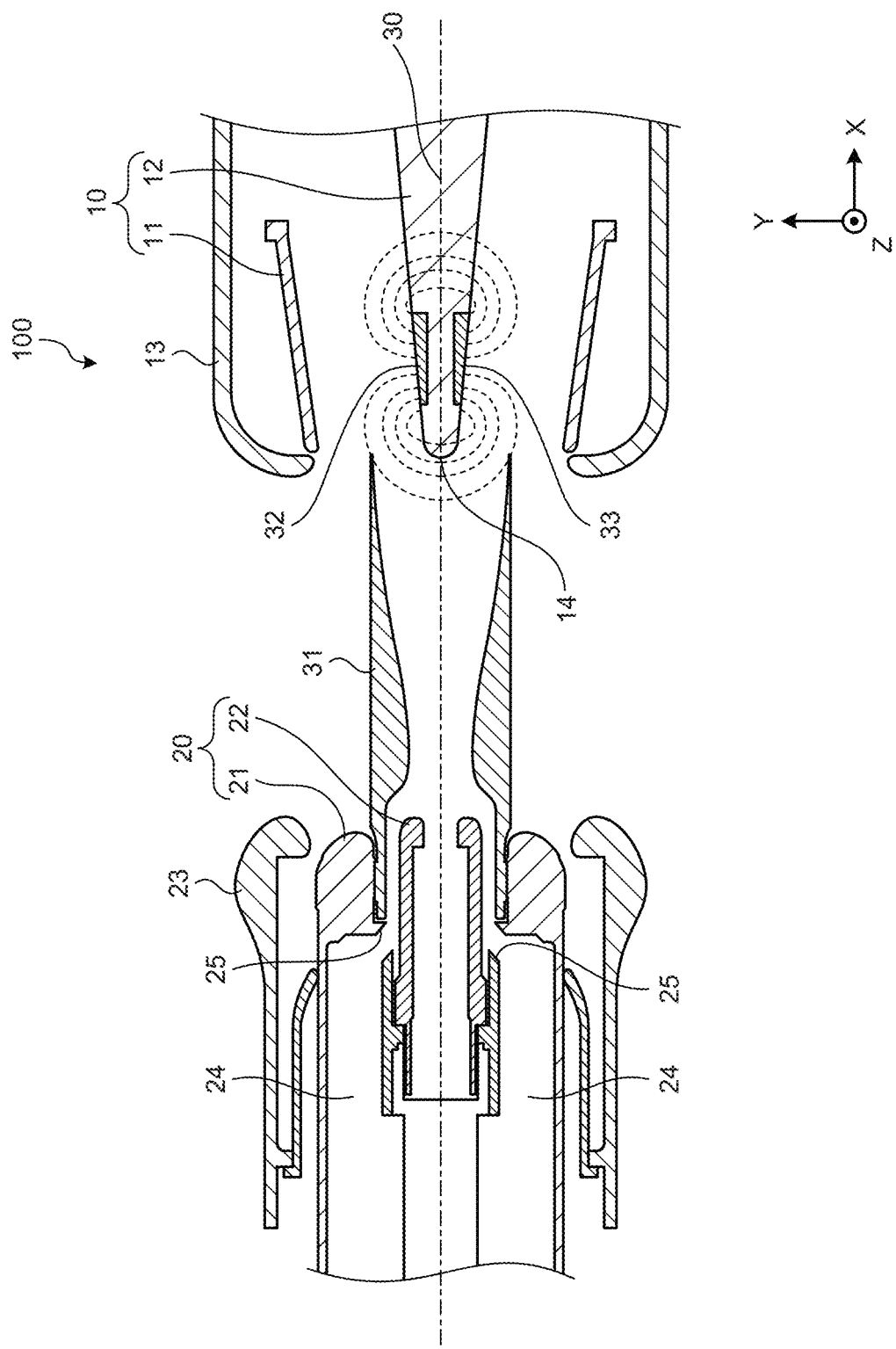
FIG. 1 is a sectional view of a main part of a gas circuit breaker according to a first embodiment of the present invention.

FIG. 1 is a sectional view of a main part of a gas circuit breaker 100 according to a first embodiment of the present invention. FIG. 1 illustrates a part of the configuration provided in an arc extinguishing chamber of the gas circuit breaker 100. The arc extinguishing chamber is disposed in a tank that is a metal container. The gas circuit breaker 100 introduces an alternating current to a conductor provided in the tank and interrupts an alternating current flowing through the conductor. FIG. 1 omits the illustration of the arc extinguishing chamber, the tank, and the conductor. The tank is filled with an insulating gas. The insulating gas is a gas having electrical insulation and an arc extinguishing property such as sulfur hexafluoride ($SF_6$) gas.

In FIG. 1 and in FIG. 2 and subsequent drawings described below, an X axis, a Y axis, and a Z axis are set as three axes perpendicular to one another. A direction parallel to the X axis is set as an X axis direction that is a first direction. A direction parallel to the Y axis is set as a Y axis direction that is a second direction. A direction parallel to the Z axis is set as a Z axis direction that is a third direction. Along the X axis direction, a direction indicated by its arrow is set as a plus X direction, and a direction opposite to the arrow is set as a minus X direction. Along the Y axis direction, a direction indicated by the arrow is set as a plus Y direction, and a direction opposite to the arrow is set as a minus Y direction. Along the Z axis direction, a direction indicated by the arrow is set as a plus Z direction, and a direction opposite to the arrow is set as a minus Z direction. FIG. 1 illustrates an X-Y cross section.

The gas circuit breaker 100 includes a fixed main contact 11 having a cylindrical shape, a fixed arc contact 12 disposed inside the fixed main contact 11, and a fixed shield 13 covering the fixed main contact 11 and the fixed arc contact 12. The fixed main contact 11 and the fixed arc contact 12 constitute a fixed contact 10 that is a contact fixed in the arc extinguishing chamber. The fixed contact 10 is connected to the conductor. The fixed shield 13 shields the fixed main contact 11 and the fixed arc contact 12 from an electric field caused when a current is applied to the conductor.

The gas circuit breaker 100 includes a movable main contact 21 having a cylindrical shape, a movable arc contact 22 disposed inside the movable main contact 21, and a movable shield 23 covering the movable main contact 21 and the movable arc contact 22. The movable main contact 21 and the movable arc contact 22 constitute a movable contact 20 that is a contact capable of moving in the arc extinguishing chamber. The movable contact 20 is connected to the conductor. The movable shield 23 shields the movable main contact 21 and the movable arc contact 22 from an electric field caused when a current is applied to the conductor.

The gas circuit breaker 100 applies the current by bringing the movable contact 20 into contact with the fixed contact 10, and interrupts the current by detecting the movable contact 20 from the fixed contact 10. An end of the fixed main contact 11 on the side of the minus X direction is open such that the movable main contact 21 can be fitted thereto at the time of current application. The gas circuit breaker 100 includes a driver configured to move the movable contact 20. FIG. 1 omits the illustration of the driver.

The movable arc contact 22 can reciprocate along an axis of motion 30 between a position when it contacts with a tip 14 of the fixed arc contact 12 and a position when it is away from the tip 14 of the fixed arc contact 12. The movable arc contact 22 moves along the axis of motion 30 that is parallel to the X axis. The movable arc contact 22 has a cylindrical shape into and from which the fixed arc contact 12 can be inserted and pulled out.

The fixed arc contact 12 is disposed on the axis of motion 30. The center of the fixed arc contact 12 in a Y-Z cross section and the center of the movable arc contact 22 in a Y-Z cross section are positioned on the axis of motion 30. The fixed arc contact 12 is set with the tip 14 being directed in the minus X direction that is one orientation in the X axis direction. Note that not only a point at the end of the fixed arc contact 12 on the axis of motion 30 but also a portion around the point may be sometimes referred to as the tip 14.

The fixed arc contact 12 has a shape gradually widened outward from the axis of motion 30 from the tip 14 in the plus X direction that corresponds to the other orientation in the X axis direction. A base portion of the fixed arc contact 12, which is an end of the contact 12 on the far side in the plus X direction, is fixed to the fixed shield 13. FIG. 1 omits the illustration of the base portion.

A nozzle 31 having a cylindrical shape is attached to an end of the movable main contact 21 in the plus X direction. The nozzle 31 extends in the plus X direction from the movable main contact 21. A portion of the movable arc contact 22 on the side in the plus X direction is covered by a portion of the nozzle 31 on the side in the minus X direction. The nozzle 31 moves together with the movable contact 20. The fixed arc contact 12 is inserted into the nozzle 31 when the movable contact 20 is moved to be in contact with the fixed contact 10. As the material of the nozzle 31, resin such as polytetrafluoroethylene (PTFE) is used.

The movable main contact 21 has a puffer chamber 24 that stores an insulating gas and outlets 25 that pass between the puffer chamber 24 and an inner wall of the movable main contact 21, which are formed in the movable main contact 21. When the movable contact 20 is pulled out from the fixed contact 10, the insulating gas is pushed into the puffer chamber 24 so that the pressure of the insulating gas inside the puffer chamber 24 is increased. The insulating gas whose pressure has been increased inside the puffer chamber 24 is blown out from the puffer chamber 24 to the nozzle 31 through the outlets 25. The outlet 25 is further provided at a position other than the positions thereof illustrated in the cross section of FIG. 1.

The fixed arc contact 12 is provided with a first permanent magnet 32 and a second permanent magnet 33. The first permanent magnet 32 is embedded in a surface of the fixed arc contact 12 on a side in the plus Y direction that is one side in the Y axis direction. The second permanent magnet 33 is embedded in the surface of the fixed arc contact 12 on a side in the minus Y direction that is another side in the Y axis direction. In FIG. 1 and in FIG. 2 and subsequent drawings described below, broken lines represent magnetic lines of force between the first permanent magnet 32 and the second permanent magnet 33.

Next, details of the fixed arc contact 12 will be described. FIG. 2 is an enlarged view of the fixed arc contact 12 included in the gas circuit breaker 100 illustrated in FIG. 1. FIG. 3 is a sectional view of the fixed arc contact 12 taken along a line III-III of FIG. 2. FIG. 2 illustrates an X-Y cross section. FIG. 3 illustrates a Y-Z cross section. FIGS. 2 and 3 omit hatching that represents a cross section.

A portion 16 of the fixed arc contact 12 including the tip 14 is made of material such as tungsten that is a metal not easily melted by an arc. A portion 17 of the fixed arc contact 12 on a side in the plus X direction relative to the portion 16 is made of metal material such as aluminum or copper. The use of aluminum or copper can reduce the influence on the magnetic force. The first permanent magnet 32 and the second permanent magnet 33 are fitted in a part of the portion 17 joined to the portion 16. The fixed main contact 11 is made of metal material whose electric resistance is lower than that of the material forming the fixed arc contact 12.

The fixed arc contact 12 has a shape obtained by deforming a conical shape centered on the axis of motion 30 with a vicinity of its apex having roundness. In the X-Y cross section illustrated in FIG. 2, a side surface 15 of the fixed arc contact 12 on the side in the plus X direction relative to the vicinity of the tip 14 having roundness forms a straight line that is inclined away from the axis of motion 30 along the plus X direction. The side surface 15 of the fixed arc contact 12 may form a curved line in the X-Y cross section illustrated in FIG. 2. The shape of the fixed arc contact 12 is not limited to the shape illustrated in FIG. 2 as long as the shape is gradually widened outward away from the axis of motion 30 from the tip 14 in the plus X direction. In the following description, the shape of the fixed arc contact 12 may be referred to as a tapered shape. As illustrated in FIG. 3, the Y-Z cross section of the fixed arc contact 12 is circular. The Y-Z cross section of the fixed arc contact 12 may have a shape other than a circular shape.

Magnetic poles of the first permanent magnet 32 and the second permanent magnet 33 are aligned to be attracted to each other. The first permanent magnet 32 has an S pole 32a disposed with being directed to a side in the minus Y direction, which is on the side of the second permanent magnet 33, and has an N pole 32b disposed with being directed to a side in the plus Y direction. The second permanent magnet 33 has an N pole 33b disposed with being directed to a side in the plus Y direction, which is on the side of the first permanent magnet 32, and has an S pole 33a disposed with being directed to a side in the minus Y direction. The first permanent magnet 32 and the second permanent magnet 33 thus have their magnetic poles aligned in the Y axis direction. The first permanent magnet 32 and the second permanent magnet 33 are held on the fixed arc contact 12 by their mutual magnetic force.

Next, the operation of the gas circuit breaker 100 will be described. When an electric current is applied to the conductor by contact between the fixed contact 10 and the movable contact 20, the movable main contact 21 is fitted into the fixed main contact 11 and at the same time the fixed arc contact 12 is inserted into the movable arc contact 22. Since the resistance of the fixed main contact 11 is lower than the resistance of the portion 16 of the fixed arc contact 12, the current flows through a linkage of the fixed main contact 11 and the movable main contact 21 between the fixed contact 10 and the movable contact 20. The current flows in the X axis direction in the fixed contact 10 and the movable contact 20.

When the movable contact 20 is moved in the minus X direction from such a state by the driver, between the fixed contact 10 and the movable contact 20, the movable arc contact 22 is pulled out from the fixed arc contact 12 after the movable main contact 21 is pulled out from the fixed main contact 11. When the movable main contact 21 is separated from the fixed main contact 11, the fixed arc contact 12 and the movable arc contact 22 remain in contact with each other, so that the current flow is changed from between the fixed main contact 11 and the movable main contact 21 to between the fixed arc contact 12 and the movable arc contact 22.

When the movable arc contact 22 is separated from the fixed arc contact 12 after the current is changed between the fixed arc contact 12 and the movable arc contact 22, an arc is formed between the fixed arc contact 12 and the movable arc contact 22.

Figure 4:
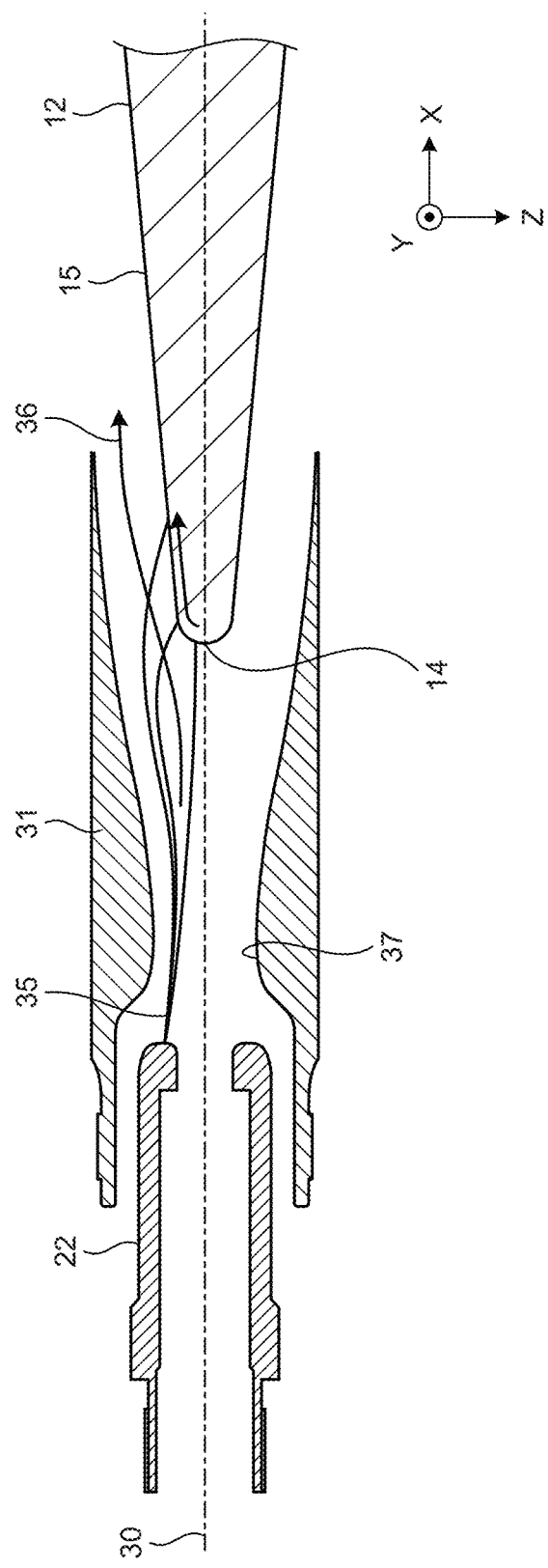
FIG. 4 is a diagram for explaining arc extinction in the gas circuit breaker illustrated in FIG. 1.

FIG. 4 is a diagram for explaining arc extinction in the gas circuit breaker 100 illustrated in FIG. 1. FIG. 4 omits the illustration of a part of the configuration of the gas circuit breaker 100 illustrated in FIG. 1. In the beginning of an arc 35 produced, the arc travels from the movable arc contact 22 toward the vicinity of the tip 14 of the fixed arc contact 12.

The inner space of the nozzle 31 is narrowed at a constricted portion 37 located on the side in the plus X direction relative to the movable arc contact 22 such that a gas flow 36 from the outlet 25 illustrated in FIG. 1 is directed toward the arc 35. Moreover, the inner space of the nozzle 31 is gradually widened from the constricted portion 37 along the plus X direction so that the gas flow 36 directed toward the arc 35 is directed to the periphery of the fixed arc contact 12. In this manner, the travel of the gas flow 36 in the inner space of the nozzle 31 is controlled so that the gas flow 36 is easily directed toward the base portion of the fixed arc contact 12 on the side in the plus X direction.

Figure 2:
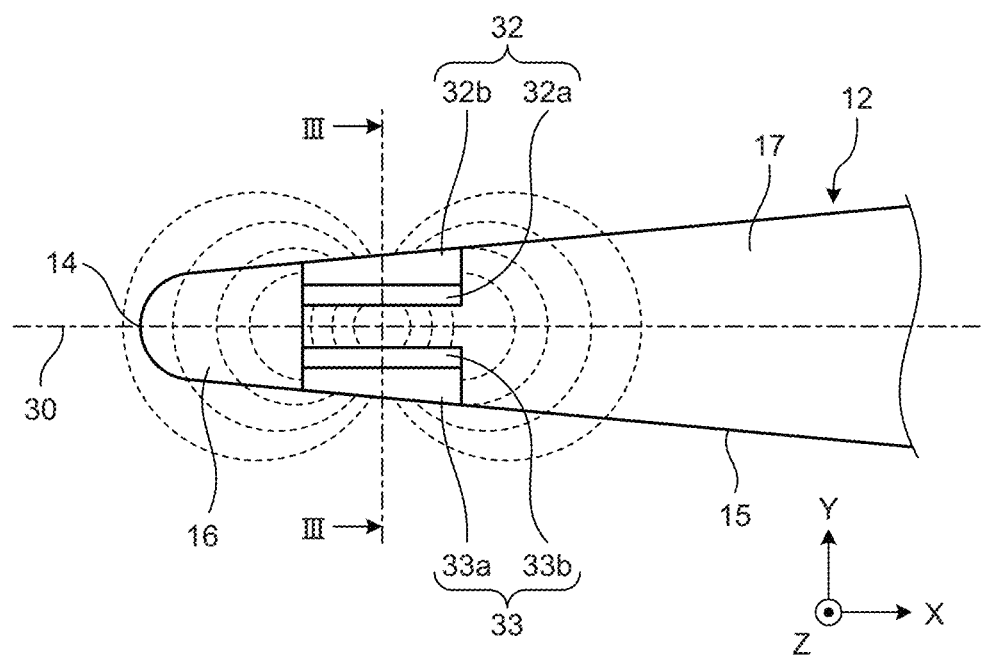
FIG. 2 is an enlarged view of a fixed arc contact included in the gas circuit breaker illustrated in FIG. 1.
Figure 3:
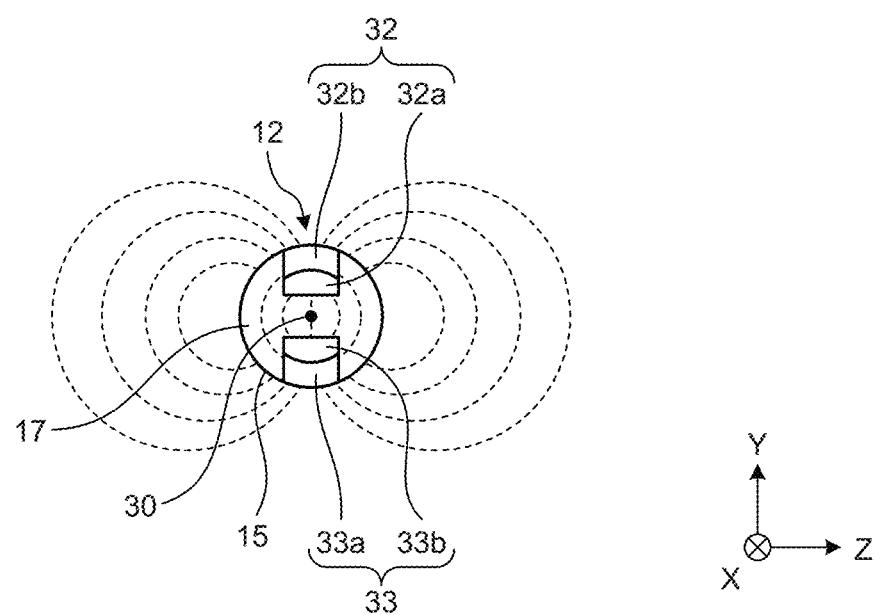
FIG. 3 is a sectional view of the fixed arc contact taken along a line III-III of FIG. 2.
Figure 5:
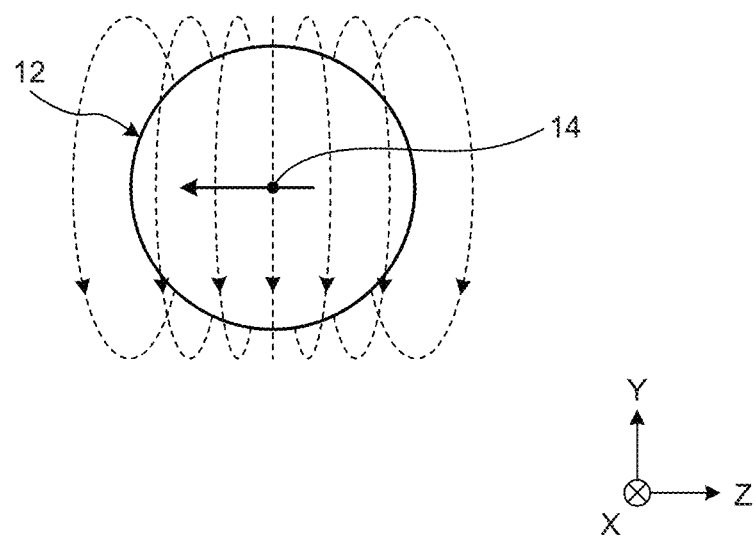
FIG. 5 is a diagram for explaining the movement of an arc caused by the action of permanent magnets provided on the fixed arc contact illustrated in FIG. 2.
Figure 6:
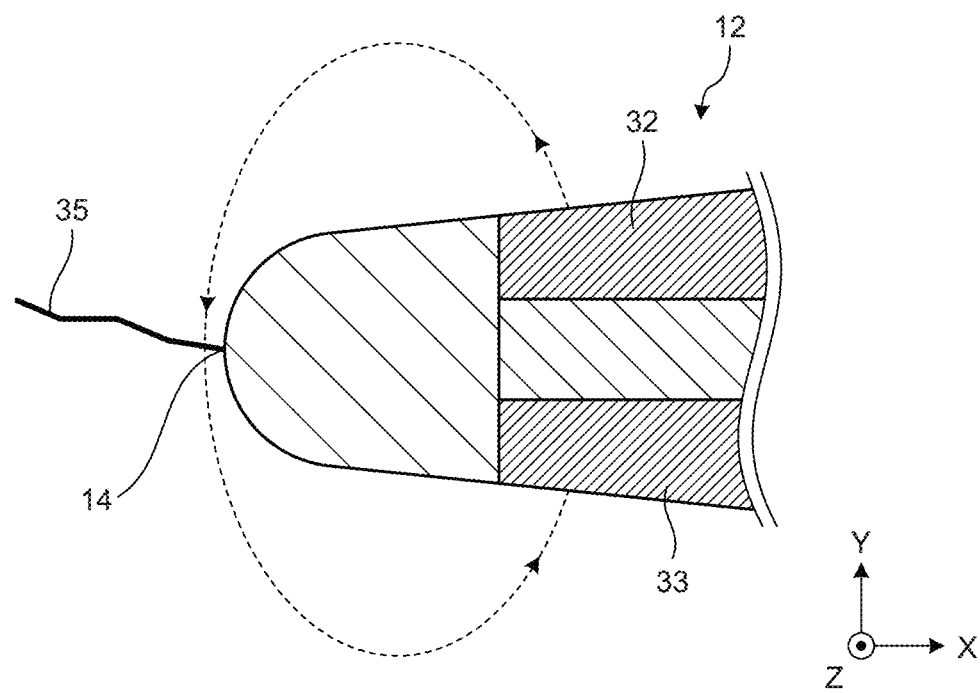
FIG. 6 is a diagram for explaining the movement of the arc caused by the action of the permanent magnets provided on the fixed arc contact illustrated in FIG. 2.

FIGS. 5 and 6 are diagrams for explaining the movement of the arc 35 caused by the action of the permanent magnets provided on the fixed arc contact 12 illustrated in FIG. 2. FIG. 5 illustrates a state of the fixed arc contact 12 as viewed in the minus X direction. FIG. 6 illustrates the X-Y cross section of a portion including the tip 14 of the fixed arc contact 12.

The direction of the magnetic field corresponds to the minus Y direction in the vicinity of the tip 14 of the fixed arc contact 12. Since the direction of an electric current is the X axis direction when the movable contact 20 is pulled out from the fixed contact 10, the arc 35 experiences the electromagnetic force in the Z axis direction. The direction of travel of the arc 35 is deflected in the Z axis direction in response to the experience of the electromagnetic force. The direction of travel of the arc 35 is deflected in either the plus Z direction or the minus Z direction depending on the direction of the alternating current at the instant when the movable contact 20 is separated from the fixed contact 10. The example illustrated in FIGS. 5 and 6 assumes that the electromagnetic force in the minus Z direction is generated as represented by a solid arrow in FIG. 5.

By the electromagnetic force in the minus Z direction acting on the arc 35, as illustrated in FIG. 4, the direction of travel of the arc 35 is deflected in the minus Z direction as compared to the moment when the arc travels toward the vicinity of the tip 14. By making the side surface 15 have an inclination having a direction away from the axis of motion 30 in the plus X direction, the arc 35 experiencing the electromagnetic force in the minus Z direction that is a direction away from the axis of motion 30 can be more easily directed to a position of the side surface 15 on the side of the plus X direction as compared to the case where the side surface does not have such an inclination. By making the fixed arc contact 12 to have a tapered shape, it is possible to facilitate the travel of the arc 35 toward the base portion of the fixed arc contact 12.

The gas circuit breaker 100 can facilitate the travel of the arc 35 toward the base portion by a synergistic effect of the fixed arc contact 12 having the tapered shape and the direction of travel of the gas flow 36 being controlled by the nozzle 31. When the arc 35 is facilitated to travel toward the base portion, the arc 35 can be directed to a space region having a temperature lower than a space region inside the nozzle 31 having a high temperature due to the production of the arc 35. This can facilitate cooling of the arc 35 and thus enables quicker arc extinction.

The deflection of the direction of travel of the arc 35 in the Z axis direction as in FIGS. 5 and 6 can prevent the arc 35 from traveling to the first permanent magnet 32 located on the surface of the fixed arc contact 12 on the side in the plus Y direction and the second permanent magnet 33 located on the surface of the fixed arc contact 12 on the side in the minus Y direction. As a result, the first permanent magnet 32 and the second permanent magnet 33 can avoid exposure to the arc 35. By providing the first permanent magnet 32 and the second permanent magnet 33 on the surface of the fixed arc contact 12, the fixed arc contact 12 equipped with the first permanent magnet 32 and the second permanent magnet 33 can be assembled easily.

The first permanent magnet 32 and the second permanent magnet 33 may be provided on a location other than the fixed arc contact 12. The first permanent magnet 32 and the second permanent magnet 33 may be located anywhere as long as the electromagnetic force can be exerted on the arc 35. The first permanent magnet 32 and the second permanent magnet 33 may be provided on any of the fixed shield 13, the movable arc contact 22, the movable shield 23, and the tank.

According to the first embodiment, the gas circuit breaker 100 can perform arc extinction quickly by virtue of the breaker 100 having the fixed arc contact 12 with the shape gradually widened in the direction away from the axis of motion 30 in the plus X direction, and the first permanent magnet 32 and the second permanent magnet 33 whose magnetic poles are aligned in the Y axis direction. As a result, the gas circuit breaker 100 obtains an effect that the breaking performance can be improved by quick arc extinction.

Second Embodiment

Figure 7:
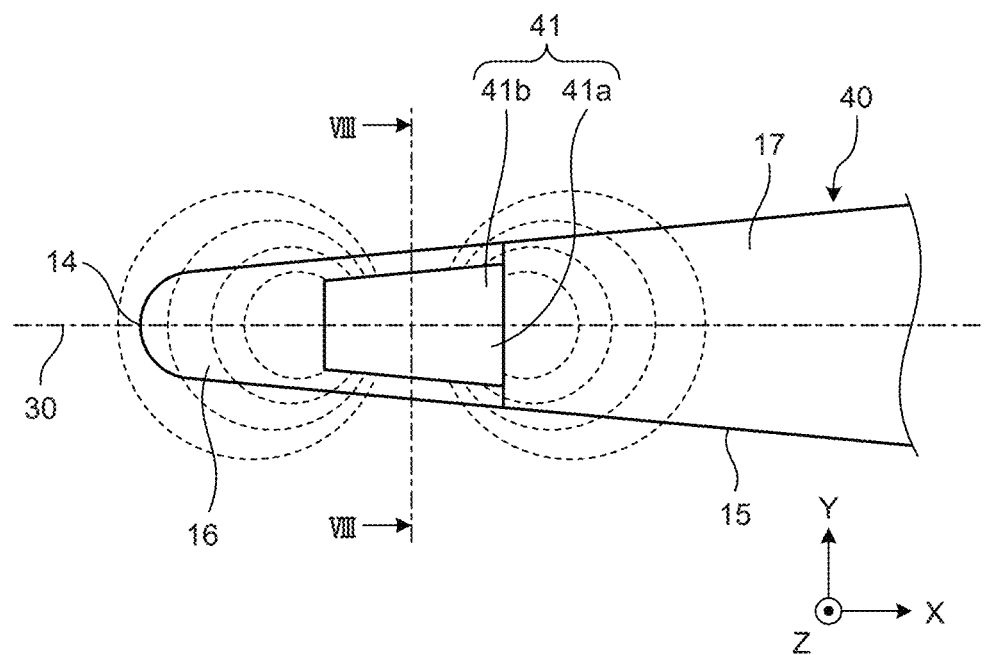
FIG. 7 is a diagram illustrating a fixed arc contact included in the gas circuit breaker according to a second embodiment of the present invention.
Figure 8:
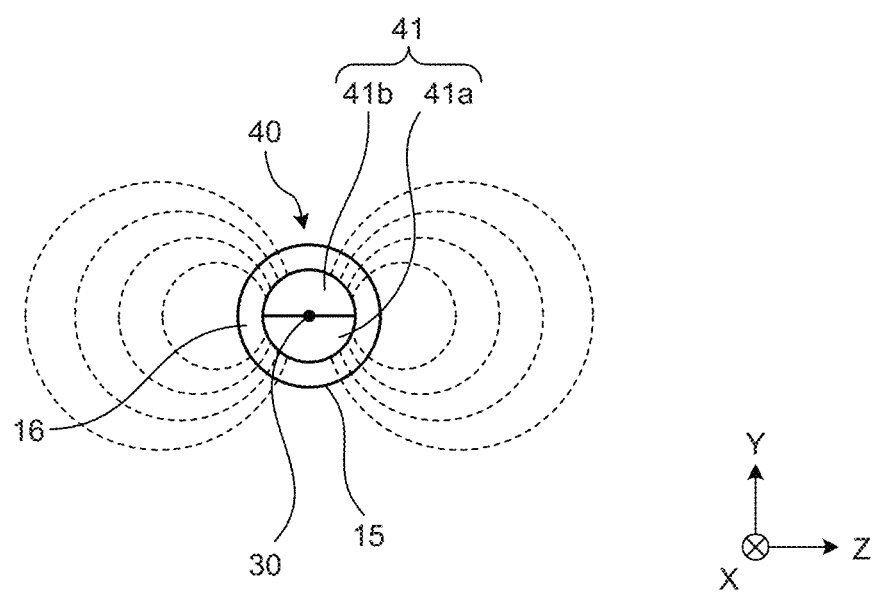
FIG. 8 is a sectional view of the fixed arc contact taken along a line VIII-VIII of FIG. 7.

FIG. 7 is a diagram illustrating a fixed arc contact 40 owned by the gas circuit breaker 100 according to a second embodiment of the present invention. FIG. 8 is a sectional view of the fixed arc contact 40 taken along a line VIII-VIII of FIG. 7. In the second embodiment, a permanent magnet 41 is embedded in the inside of the fixed arc contact 40. The gas circuit breaker 100 according to the second embodiment has the configuration similar to that of the gas circuit breaker 100 of the first embodiment except that the fixed arc contact 40 is provided in place of the fixed arc contact 12 of the first embodiment. In the second embodiment, the same components as those in the above first embodiment are denoted by the same reference symbols as those assigned to such components in the first embodiment, and a configuration different from that of the first embodiment will be mainly described. FIG. 7 illustrates an X-Y cross section. FIG. 8 illustrates a Y-Z cross section. FIGS. 7 and 8 omit hatching that represents a cross section.

The fixed arc contact 40 has a configuration similar to that of the fixed arc contact 12 of the first embodiment except that a permanent magnet 41 is provided in place of the first permanent magnet 32 and the second permanent magnet 33. The permanent magnet 41 is set with its S pole 41a being situated on a side in the minus Y direction and its N pole 41b being situated on a side in the plus Y direction. The permanent magnet 41 has magnetic poles aligned in the Y axis direction. The permanent magnet 41 is disposed in the inside of the portion 16. An end of the permanent magnet 41 on the side in the plus X direction and an end of the portion 16 on the side in the plus X direction are attached to an end of the portion 17 on the side of the minus X direction.

As with the first permanent magnet 32 and the second permanent magnet 33 of the first embodiment, the permanent magnet 41 produces a particular magnetic field in the minus Y direction. Also in the second embodiment, the gas circuit breaker 100 can deflect the direction of travel of the arc 35 by producing an electromagnetic force in the Z axis direction.

In the second embodiment, the permanent magnet 41 is embedded in an inner part of the fixed arc contact 40 and can thereby avoid direct exposure to the arc. With the permanent magnet 41 disposed inside the fixed arc contact 40, the influence of the magnetic force of the permanent magnet 41 on energization can be reduced.

According to the second embodiment, the gas circuit breaker 100 has the fixed arc contact 40 and the permanent magnet 41 provided therein, so as to be able to perform quicker arc extinction. As a result, the gas circuit breaker 100 achieves an advantageous effect that the breaking performance can be improved by the quicker arc extinction.

The configurations illustrated in the above embodiments merely illustrate examples of the content of the present invention, and can each be combined with other publicly known techniques and partially omitted and/or modified without departing from the scope of the present invention.

REFERENCE SIGNS LIST 10 fixed contact; 11 fixed main contact; 12, 40 fixed arc contact; 13 fixed shield; 14 tip; 15 side surface; 16, 17 portion; 20 movable contact; 21 movable main contact; 22 movable arc contact; 23 movable shield; puffer chamber; 25 outlet; 30 axis of motion; 31 nozzle; 32 first permanent magnet; 32a, 33a, 41a S pole; 32b, 33b, 41b N pole; 33 second permanent magnet; 35 arc; 36 gas flow; 37 constricted portion; 41 permanent magnet; 100 gas circuit breaker.

The invention claimed is:

1. A gas circuit breaker comprising:
a fixed arc contact disposed on an axis of motion, whose tip is directed to one side in a first direction that is parallel to the axis of motion;
a movable arc contact reciprocatable along the axis of motion between a position when in contact with the tip of the fixed arc contact and a position when separated from the tip of the fixed arc contact; and
a permanent magnet whose magnetic poles are aligned in a second direction that is a direction perpendicular to the first direction, wherein
the fixed arc contact has a tapered shape that is gradually widened in a direction away from the axis of motion from the tip toward another side in the first direction.

2. The gas circuit breaker according to claim 1, wherein the permanent magnet is provided on the fixed arc contact.

3. The gas circuit breaker according to claim 2, wherein the permanent magnet includes:
a first permanent magnet fitted in a surficial portion of the fixed arc contact on one side in the second direction; and
a second permanent magnet fitted in a surficial portion of the fixed arc contact on another side in the second direction.

4. The gas circuit breaker according to claim 2, wherein the permanent magnet is embedded in an inside portion of the fixed arc contact.

5. The gas circuit breaker according to claim 1, wherein the tip of the fixed arc contact is a curved surface of the fixed arc contact.

6. The gas circuit breaker according to claim 1, wherein the tip of the fixed arc contact is a curved surface of the fixed arc contact and located on the axis of motion.

7. The gas circuit breaker according to claim 1 further comprising:
a cylindrical nozzle which is attached to an end of the movable main contact and extends in the first direction.

8. The gas circuit breaker according to claim 7, wherein the cylindrical nozzle includes an internal space having a constricted portion, and the internal space of the nozzle gradually widens from the constricted portion in the first direction.

* * * * *